(12) United States Patent
Pantelias

(10) Patent No.: US 9,450,692 B2
(45) Date of Patent: Sep. 20, 2016

(54) SCHEDULING IN A TWO-TIER NETWORK

(71) Applicant: Broadcom Corporation, Irvine, CA (US)

(72) Inventor: Niki Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/724,235

(22) Filed: May 28, 2015

(65) Prior Publication Data

US 2015/0263817 A1 Sep. 17, 2015

Related U.S. Application Data

(63) Continuation of application No. 13/538,079, filed on Jun. 29, 2012, now Pat. No. 9,055,483.

(60) Provisional application No. 61/525,485, filed on Aug. 19, 2011.

(51) Int. Cl.
| | | |
|---|---|---|
| *H04L 12/54* | (2013.01) | |
| *H04L 12/70* | (2013.01) | |
| *H04L 29/06* | (2006.01) | |
| *H04L 12/801* | (2013.01) | |

(Continued)

(52) U.S. Cl.
CPC .............. *H04J 3/16* (2013.01); *H04B 10/27* (2013.01); *H04L 12/2801* (2013.01); *H04W 28/20* (2013.01); *H04W 72/085* (2013.01)

(58) Field of Classification Search
CPC .............. H04L 12/5693; H04L 2012/5679; H04L 29/06; H04L 47/10; H04L 29/06027; H04L 12/5695

USPC ................................... 370/395.4, 465, 466
See application file for complete search history.

(56) References Cited

U.S. PATENT DOCUMENTS

| | | |
|---|---|---|
| 5,745,837 A | 4/1998 | Fuhrmann |
| 6,031,844 A | 2/2000 | Lin |

(Continued)

FOREIGN PATENT DOCUMENTS

| | | |
|---|---|---|
| CN | 101073260 A | 11/2007 |
| KR | 10-0819118 B1 | 4/2008 |
| TW | 200705921 A | 2/2007 |

OTHER PUBLICATIONS

European Search Report, dated Nov. 16, 2012, for European Patent Appl. No. 12005464.8, 3 pages.

(Continued)

*Primary Examiner* — Ronald B Abelson
(74) *Attorney, Agent, or Firm* — Sterne, Kessler, Goldstein & Fox PLLC

(57) ABSTRACT

A method, system and computer program product to schedule transmissions in a two-tier network are provided. In an example, the system includes a Data Over Cable Service Interface Specification (DOCSIS) scheduler configured to generate a MAP message to allocate bandwidth and a first instance in time to a cable modem to transmit data to a branch node. The system further includes a MAP message translator coupled to the DOCSIS scheduler and configured to determine a second instance in time at which data from the cable modem arrives at the branch node and generate a GATE message that grants the branch node bandwidth to transmit the data received from the cable modem at the second instance in time to a headend node.

20 Claims, 8 Drawing Sheets

(51) Int. Cl.
   *H04J 3/16*     (2006.01)
   *H04W 28/20*    (2009.01)
   *H04B 10/27*    (2013.01)
   *H04L 12/28*    (2006.01)
   *H04W 72/08*    (2009.01)

(56) References Cited

U.S. PATENT DOCUMENTS

| | | |
|---|---|---|
| 6,490,727 B1 | 12/2002 | Nazarathy et al. |
| 6,965,607 B1 | 11/2005 | Landberg et al. |
| 8,711,878 B2 | 4/2014 | Denney et al. |
| 9,055,483 B2 | 6/2015 | Pantelias |
| 2002/0057709 A1 | 5/2002 | Edmon et al. |
| 2002/0097747 A1 | 7/2002 | Kirkby et al. |
| 2003/0103527 A1 | 6/2003 | Beser |
| 2006/0126505 A1 | 6/2006 | Denney et al. |
| 2013/0044766 A1 | 2/2013 | Pantelias |

OTHER PUBLICATIONS

Office Action for Korean Patent Application No. 10-2012-0088309, mailed on Apr. 23, 2014.

English-language Abstract for KR 10-0819118 B1, published Apr. 3, 2008, accessed from espacenet Database-Worldwide.

Office Action directed to related Taiwanese Patent Application No. 101129031, mailed Jul. 3, 2014; 6 pages.

Office Action directed to related Chinese Patent Application No. 201210295876.4, mailed on Nov. 4, 2014; 7 pages.

English machine-translation of claims of Korean Patent No. KR 10-0819118 B1, granted Apr. 3, 2008, 4 pages (translation retrieved from KIPRIS at http://engpat.kipris.or.kr/).

SCHEDULING IN A TWO-TIER NETWORK

CROSS REFERENCE TO RELATED APPLICATIONS

This application is a continuation of U.S. patent application Ser. No. 13/538,079, filed Jun. 29, 2012, now U.S. Pat. No. 9,055,483, which claims the benefit of U.S. Provisional Application No. 61/525,485, filed Aug. 19, 2011, both of which are incorporated herein by reference in it their entireties.

BACKGROUND OF THE INVENTION

1. Field of the Invention

This invention generally relates to scheduling in a point-to-multipoint network.

2. Background Art

A two-tier network that includes different media, such as optical and coaxial, presents difficulties in scheduling transmission to and from end stations due to difference in protocols in use over the different media. Methods and systems are needed to overcome these deficiencies.

BRIEF DESCRIPTION OF THE FIGURES

The accompanying drawings, which are included to provide a further understanding of the disclosure and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

Figure 1:
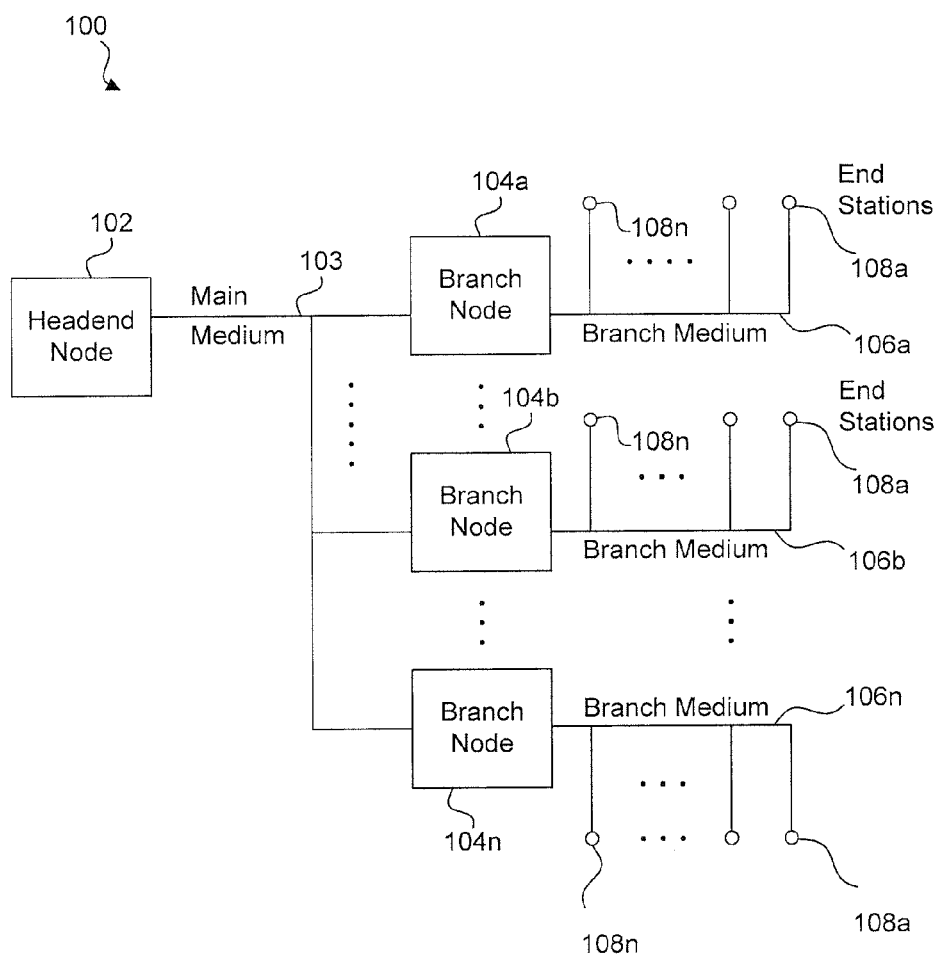
FIG. 1 illustrates a topology of a two-tier network.

While the present examples described herein with reference to illustrative embodiments for particular applications, it should be understood that the examples are not limited thereto. Those skilled in the art with access to the teachings provided herein will recognize additional modifications, applications, and embodiments within the scope thereof and additional fields in which the embodiments would be of significant utility.

A common architecture for a two-way communication system is point-to-multipoint network over a shared medium. One example is a cable data communications system such as a Data Over Cable Service Interface Specification (DOCSIS) compliant communication system. In this system, a single headend node, which may include a Cable Modem Termination System (CMTS), communicates with multiple end user nodes such as cable modems (CMs) over a shared coaxial cable or hybrid-fiber-coaxial (HFC) medium. "Coaxial cable" may be referred to as "coaxial medium" or "coax" herein. Another example is a wireless Wi-Fi system in a typical home network where a single wireless base station may communicate with multiple user devices over a shared band in the wireless spectrum. Another example is a cellular system in which a single cellular base station may be communicating with multiple handsets in the same band. Yet another example is a Passive Optical Network (PON) in which a single Optical Line Terminal (OLT) communicates with multiple Optical Network Units (ONUs) over a shared optical medium.

In these types of two-way communication systems, only a single device can communicate on a given channel, or portion of a channel, at any given time. The protocols in use on the networks determine which device uses the channel or a specified portion of the channel at any given time. In an Open Systems Interconnection (OSI) model, a Media Access Control (MAC) layer typically determines the order of transmission by end user devices. In DOCSIS, PON and other systems, a scheduler that resides in a headend node (such as a CMTS in a DOCSIS network or an OLT in a PON network) decides when and for what duration each of the end stations (such as a CM in a DOCSIS system or an ONU in a PON system) will have use of the communication medium. In the downstream direction (that is from the headend node to an end station), the headend node is the only transmitter, so it can autonomously decide which end station to address data to at what time and then send the data. In the upstream direction (from an end station to the headend node), the scheduler at the headend delivers a message to each of the end stations to let it know when it will be allowed to transmit data to the headend node and for how long it can transmit data.

There are many possible algorithms the scheduler might use in determining when and how much traffic will be allowed to flow to or from the various end stations. For example, the scheduler could use a round-robin or weighted round-robin approach to offer substantially constant bandwidth to each end station. In packet-based communications systems, the scheduler may incorporate a request-grant mechanism. In a request-grant mechanism, the scheduler designates time slots which end stations can use to report information about the amount of data they have or expect to have available for transmission. The scheduler delivers a message to the end stations to inform them of these time slots. After the end stations have responded, the scheduler uses the received information about amount of data at each end station, plus other information such as the type of traffic and desired Quality of Service (QoS) treatment for each request, to allocate time slots to end stations for transmission of data; a message containing information about these data transmission time slots is delivered to the end stations. Finally, the end stations respond by transmitting data during the allocated time slots.

A request-grant mechanism is preferred for traffic that is not constant (e.g., best-effort traffic for web browsing, which exhibits short bursts of activity mixed with longer idle periods) because it causes bandwidth to be allocated to an end station only when that station has traffic to send. This allows for statistical multiplexing of the medium (e.g. of a coaxial cable medium), giving much higher utilization and better performance. A drawback of using a request-grant mechanism is that it introduces an additional source of delay into the upstream path. An end station with data to transmit must wait for the scheduler to provide an opportunity to request bandwidth for transmission of data, and then wait again for the scheduler to provide a time slot for transmission of the data.

For constant-bandwidth traffic (e.g. voice traffic), it is often preferable to avoid using the request-grant mechanism. Instead, the scheduler uses prior information about the traffic to make data transmission opportunities available to the end station without requiring the end station to report data availability first. For example, if an end station is engaged in an ITU-T standard G.711-coded Voice-over-IP (VoIP) telephony call with a packetization interval of 20 msec, the scheduler will provide transmit opportunities sized appropriately for a G.711 packet once per 20 msec.

A scheduler may employ a combination of various methods. For instance, it may use a request-grant mechanism for certain types of traffic from an end station, but not use it for other types of traffic. As an example of this, in DOCSIS, a constant-bandwidth Unsolicited Grant Service (UGS) service flow may be used for real time voice calls from a device, while a request-grant mechanism may be used for best-effort data traffic from the same cable modem.

The UGS service flow minimizes delay on the VoIP packets, while the request-grant mechanism maximizes network efficiency for the best-effort data, at the price of an increase in latency. In theory, best-effort flows are latency-tolerant. In practice, however, the performance of UGS service flows may be negatively impacted by the increased latency. For example, if the latency is low on TCP acknowledge (ACK) messages being returned in the upstream, then a downstream Transmission Control Protocol (TCP) flow using a slow-start algorithm may ramp up to maximum speed in a shorter period of time. Excessive latency on upstream TCP ACKs may prevent the downstream flow from ever reaching its maximum rate. Also, a request-grant mechanism may be used for services that exhibit burst data patterns and/or have variable bandwidth needs, but are still latency-sensitive, e.g. a two-way videoconference using variable-bit-rate compression, or a real-time gaming or cloud computing service which requires user keystrokes to be transmitted to a remote server as quickly as possible. Thus, it is desirable to minimize the latency added by the request-grant mechanism in a point-to-multipoint system.

It is also possible to have a two-tier point-to-multipoint network. FIG. 1 illustrates an example to two-tier point-to-multipoint network 100 according to an embodiment. Network 100 includes a headend node 102 coupled to branch nodes 104a-n via a main medium 103. Main medium 103 forms the first tier of the two-tier network. Branch nodes 104a-n are coupled to end stations 108a-n via branch media 106a-n. Branch media 106a-n forms the second tier of the two-tier network.

In network 100, the headend node 102 communicates over a shared medium, such as main medium 103, with multiple end stations 108. Branch nodes 104 may duplicate and provide some or all of the services of headend node 102 to end stations 108 over branch media 106. This topology could be extended to encompass systems with more than two tiers. For example, one or more of the end stations 108 of the second tier could in turn provide the functionality of a branch node to additional end stations over another media.

It is to be appreciated that although the examples presented herein are described with reference to a two-tier system, the examples are applicable to networks with more than two tiers.

Figure 2:
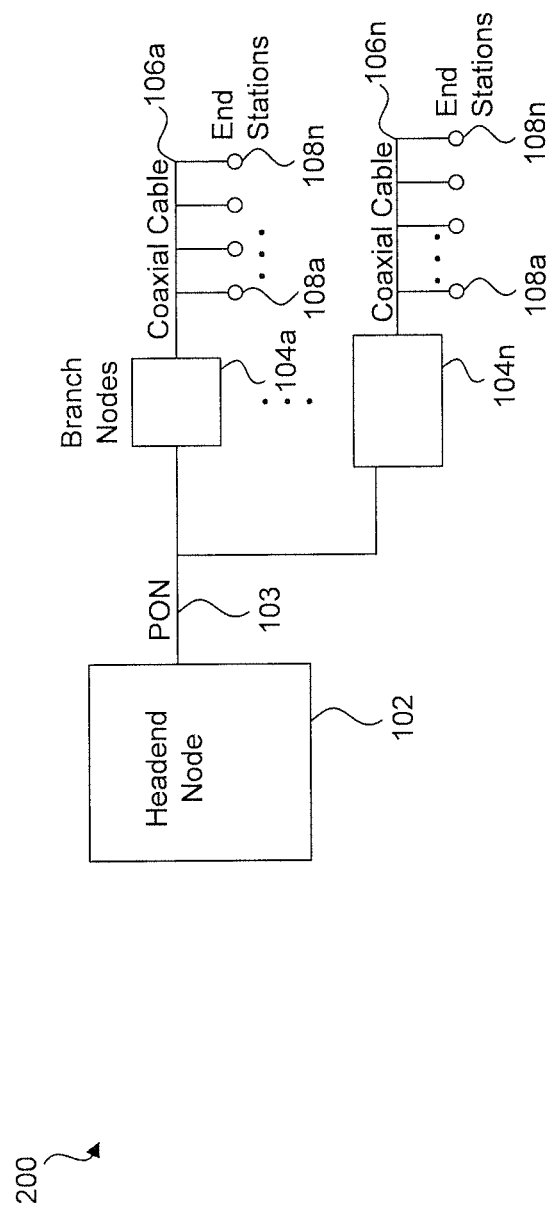
FIG. 2 illustrates an example two-tier network in which a main medium is a Passive Optical Network (PON) and branch media are coaxial cable.

FIG. 2 illustrates a further example of a two-tier network 200. In network 200, main medium 103 is an optical medium such as PON and the branch medium 106 is coaxial cable. An Ethernet Passive Optical Network (EPON) protocol may be used to schedule transmissions over main medium 103 and a DOCSIS protocol may be used to schedule transmissions over branch media 106. Due to the difference in protocols in network 200, scheduling has to be performed separately for the main medium 103 and for the branch media 106. Thus two tiers of scheduling may have to be performed for two-tier networks. The two tiers of scheduling can lead to buffering in addition to scheduling delays.

Another example of a two-tier network is a Wi-Fi home network that includes one or more repeaters or "range extenders". Wi-Fi repeaters typically sold for home use create a separate wireless network from the main Access Point (AP) or base station. Thus, each repeater may function as a branch node 104 which may reach multiple end stations. In this example, the main medium may be PON, coaxial cable, or Wi-Fi from the main AP, and the branch media are additional Wi-Fi channels. The media of the various branch nodes may partially or completely overlap with each other or with the main medium, making it necessary to coordinate the timing of transmissions across branches.

It is to be appreciated that each of branch media 106 may not be of the same medium. For example, branch medium 106a might be a wireless medium whereas branch medium 106n may be an optical medium, with separate scheduling requirements for each medium. In the examples presented herein, the main medium uses a DOCSIS standard while the branch medium uses an EPON standard. However, in alternate embodiments the main medium may use the EPON standard and the branch medium may use the DOCSIS standard. It is also to be appreciated that although the embodiments presented herein are described with reference to the DOCSIS and EPON standards, the embodiments are not limited to any specific type of standard, protocol or network configuration i.e. the main medium and the branch medium can use any type of standard, protocol or network configuration.

Figure 3:
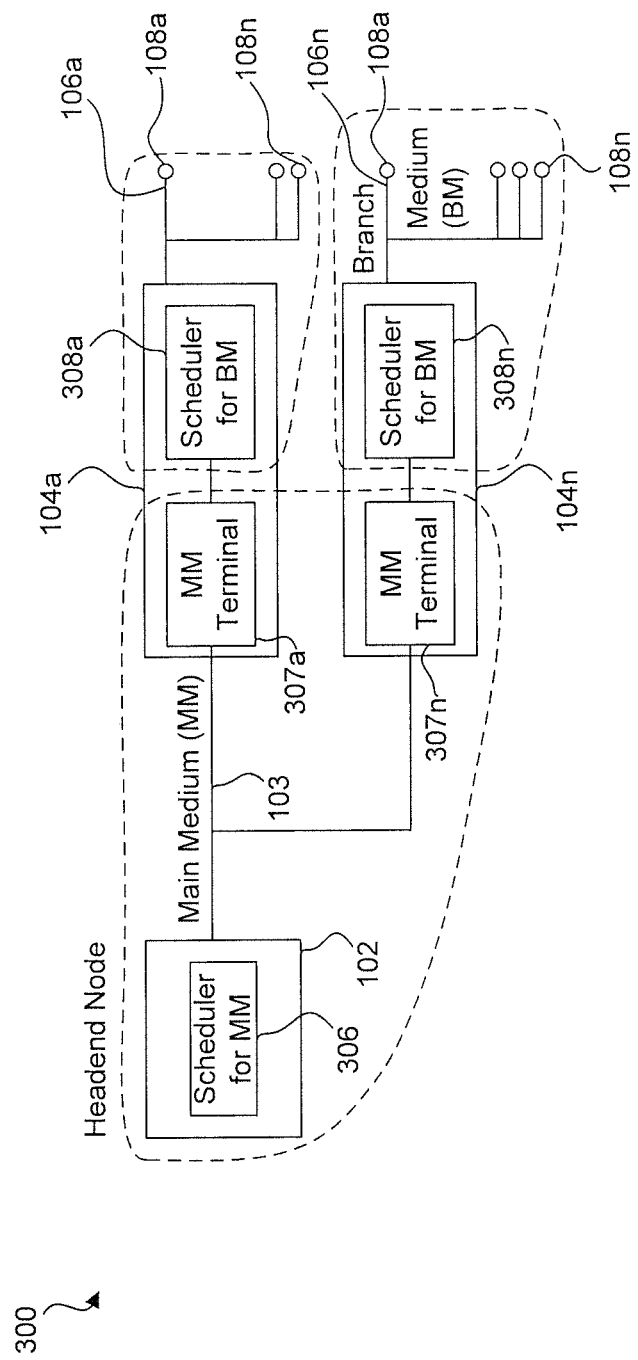
FIG. 3 illustrates de-centralized scheduling in a two-tier network.

In any point-to-multipoint network with multiple tiers, it is necessary to decide where in the system the scheduling function should be located. Scheduling may be distributed in a number of nodes, centralized in a single node, or some combination of the two. FIG. 3 illustrates an example network 300 that utilizes de-centralized scheduling in a two-tier network. In the example in FIG. 3, a headend node 102 performs scheduling for each of the branch nodes 104a-n. Each of the branch nodes 104 in turn performs scheduling for their associated end stations 108. For example, headend node 102 includes a scheduler 306 that performs scheduling for each of the branch nodes 104a-n by communicating with main media (MM) terminals 307a-n. Similarly each scheduler 308a-n performs scheduling for respective end stations 108 that are part of its network using respective schedulers 308. Scheduler 306 may include, for example, part or all the functionality of an EPON scheduler. Schedulers 308 may include, for example, part or all the functionality of a DOCSIS scheduler.

In an example, an end station 108 requests a corresponding branch node 104 for bandwidth to transmit data. The branch node 104 schedules the request and issues a bandwidth grant, using scheduler 308, to the end station 108. The end station 108 transmits data packets to the branch node 104 based on the received bandwidth grant. Upon receiving the data packets from the end station 108, the branch node 104 sends an "EPON REPORT" to headend node 102 to request bandwidth for the received data packets. Scheduler 306 schedules and issues a bandwidth grant to the branch node 104. In response to the grant received from scheduler 306, branch node 104 sends the data packet received from the end station 108 to headend node 102. Headend node 102 may then forward the packet over a Wide Area Network, such as the Internet (not shown).

De-centralized scheduling as described above with respect to FIG. 3 appears to be straightforward but may have drawbacks. For example, the cost and complexity of each branch node 104 may be cost prohibitive, since each branch node 104 includes logic circuits and processing power to support scheduling functions that are performed by scheduler 308. In addition, in the upstream direction, the bandwidth requests received by the headend node 102 from the branch nodes 104 may contain information only about the aggregate traffic at that node, i.e., information about traffic from each individual end station 108 may not be provided by the branch node 104 due to limitations of the protocol in use. The lack of information about end stations 108 may cause the headend node 102 to make less optimum scheduling decisions than it might if it had information about available traffic from every end station 108. For instance, the end stations 108 from one particular branch node 104 supporting many users might be receiving less service than end stations 108 on a different branch node 104 supporting fewer users. The desired corrective action might be for the scheduler 306 in headend node 102 to increase allocations to the branch node 104 with the higher number of users. However, without information about traffic requirements of individual end stations 108, the scheduler 306 at headend node 102 may not be able to perform the desired allocation.

Furthermore, in the upstream direction, if request-grant mechanisms are in use on both tiers, traffic experiences two request-grant delays because scheduling has to occur once on the main medium 103 and then again on branch media 106. This results in scheduling and buffering delays. For example, for an upstream transmission from an end station 108, scheduler 308 has to request bandwidth for each transmission from scheduler 306. Data received by a branch node 104 from an end station 108 has to be buffered while scheduler 308 waits for a response from scheduler 306. This may cause scheduling delays along with buffering issues. For example, if the scheduling delay is excessive, buffers in a branch node 104 may overflow. In addition, scheduler 306 may not have the granularity to provide Quality of Service (QoS) for individual end stations 108a-n. For example, scheduler 306 for main medium 103 may be able to provide aggregate services for branch nodes 104, but cannot cater to individual QoS requirements for each of the end stations 108.

Centralizing the scheduling function in the headend node 102 may address some of the issues of de-centralized scheduling. For example, the branch nodes 104 need not contain any scheduling functionality, so they may be simpler and less costly. In addition, for upstream traffic, a centralized scheduler in the headend node 102 would receive reports from all individual end stations 108, giving it the information needed to make optimum choices.

Figure 4:
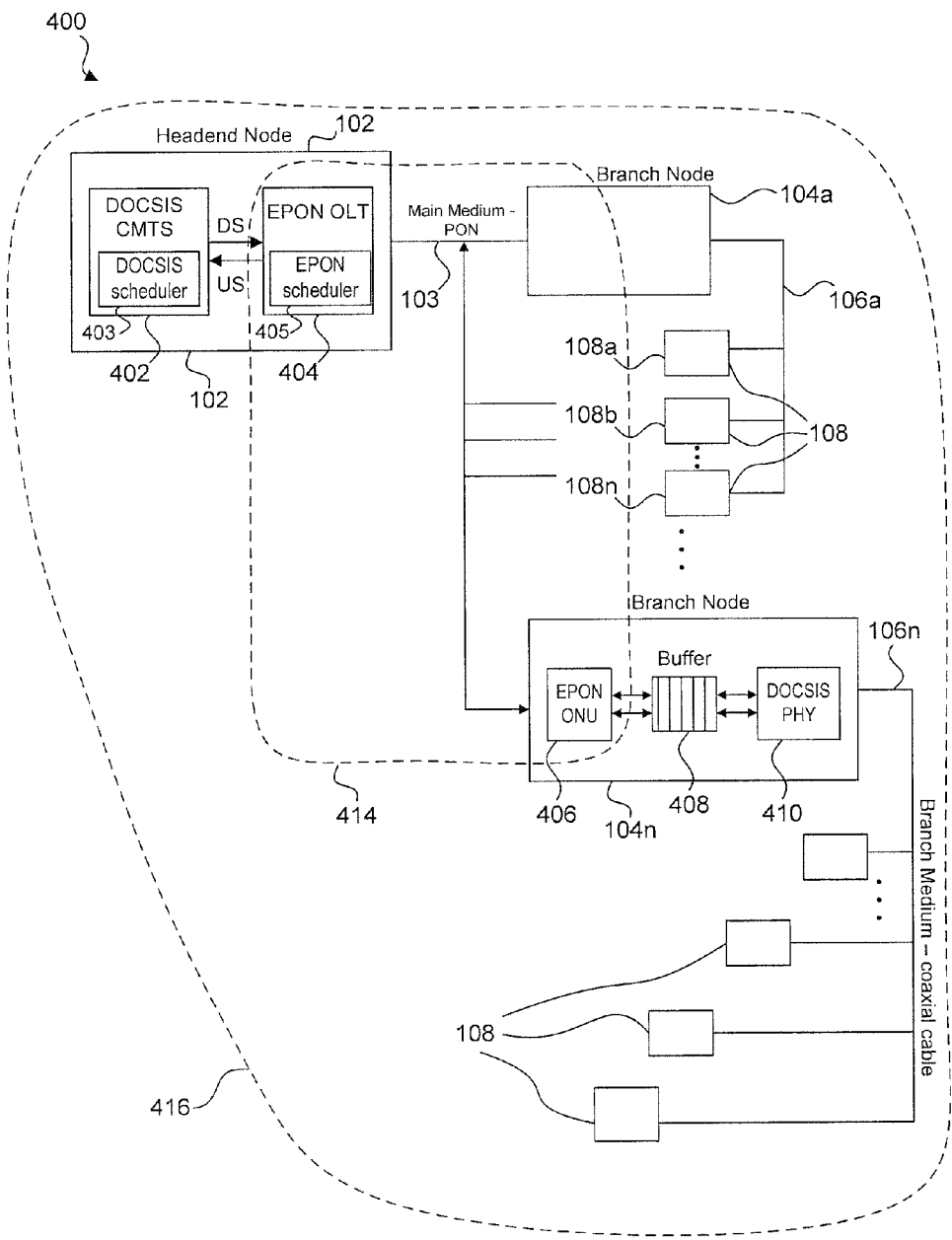
FIG. 4 illustrates centralized scheduling in a two-tier network

FIG. 4 illustrates an exemplary network 400 utilizing centralized scheduling. In the example in FIG. 4, headend node 102 includes a DOCSIS CMTS 402, that has a DOCSIS scheduler 403, and an EPON OLT 404 that has an EPON scheduler 405. Main medium 103 is a PON and branch media 106 are coaxial cable. In the example in FIG. 4, DOCSIS scheduler 402 performs scheduling for each of the end stations 108, which may be cable modems. Scheduler 402 transmits DOCSIS MAP messages that allocate the requested bandwidth to end stations 108. The EPON scheduler 404, grants bandwidth to the branch nodes 104a-n. Each branch node 104 may include an EPON ONU 406, which forms the interface with the PON of main medium 103. EPON ONU 406 is coupled to buffer 408, which buffers downstream and upstream communications to and from end stations 108. DOCSIS PHY 410 forms the interface with the coaxial cable of branch media 106.

In an example, an end station 108 transmits a DOCSIS request for bandwidth to its corresponding branch node 104. In response to the DOCSIS request, the branch node 104 sends an EPON REPORT to request bandwidth from EPON OLT 404 for transmitting the received DOCSIS request to EPON OLT 404.

In response to the EPON REPORT, EPON OLT 404, using EPON scheduler 405, sends an EPON GATE message that allows branch node 104 to transmit the DOCSIS request received from end station 108 to EPON OLT 404. EPON OLT 404 grants bandwidth to transmit the DOCSIS request to branch node 104. Upon receiving the requested bandwidth, branch node 104 transmits the DOCSIS request to EPON OLT 404. EPON OLT 404 transfers the received DOCSIS request to DOCSIS CMTS 402. DOCSIS scheduler 403 schedules and issues a grant in a MAP message, which is first sent to EPON OLT 404. EPON OLT 404 transmits the MAP message to branch node 108, which then forwards the MAP message to end station 108.

Upon receiving the MAP message with the allocated bandwidth, end station 108 transmits data to branch node 104. Branch node 104 again sends an EPON REPORT to EPON OLT 404 to request bandwidth to send data received from end station 108. EPON scheduler 405 schedules an EPON GATE message to allow branch node 104 to transmit the received data to headend node 102. Branch node 104 transmits the packet to headend node 102, which may forward the received packet to a WAN.

From the preceding example, it can be seen that the centralized scheduling in FIG. 4 presents problems when the different tiers of the network 400 use different MAC-layer protocols. As described above, in the system of FIG. 4, the PON used for the main medium 103 is controlled by the EPON protocol, while DOCSIS may be the preferred protocol for communicating with and managing end stations on branch media 106. Centralizing the DOCSIS scheduler 402 results in a system where an EPON system 414 is enclosed by a DOCSIS system 416 as shown in FIG. 4. Because of the differences in protocols in network 400, the DOCSIS scheduler 403 cannot control traffic on the PON, so the EPON request-grant mechanism operates within the DOCSIS request-grant mechanism. The centralized scheduling in network 400 results in additional delays, as in the detailed example above in which a DOCSIS request to transmit available upstream traffic from an end station 108 is first received and buffered at the branch nodes 104, followed by a delay for a request-grant process to complete on the PON so that the original request from end station 108 can finally be sent to the headend node 102. When the headend node 102 has allocated a slot for transmission of data, it delivers that information to the EPON scheduler 405 for transmission to the branch nodes 104 and then to the end station 108. Finally, when an end station 108 transmits its data, that data is received and buffered at the branch node 104, which then needs to complete another request-grant cycle on the PON to transmit the data received from the end station 108 to headend node 102. It is clear that the centralized scheduling approach results in many more steps, and consequently increased delay, when compared with the decentralized approach.

Furthermore, the EPON scheduler 404 is not cognizant of the Quality of Service (QoS) guaranteed for each end station 108. For example, an end station 108a may have a first QoS associated with it, which differs from a QoS associated with end station 108b. However, the EPON scheduler 404 allocates aggregate bandwidth to each branch node 104 and cannot individually support the QoS requirements for each end station 108. Thus there is a lack of granular QoS support in centralized scheduling as shown in FIG. 4.

One system that offers a possible solution to this problem extends an EPON MAC-layer protocol beyond branch nodes 104 and across coaxial branch media 106 to end stations 108 using a PHY-layer translation to accommodate the differing characteristics of the PON and coaxial media. The single MAC protocol allows the headend node 102 to control scheduling of both the PON and coaxial tiers of the network. However, in some cases a system provider may prefer to retain the DOCSIS protocol in the end stations. For instance, the service provider may wish to take advantage of DOCSIS features for management of the coaxial cable PHY, or to use existing DOCSIS cable modem and/or CMTS products incorporating features such as routing or VoIP support.

Figure 5:
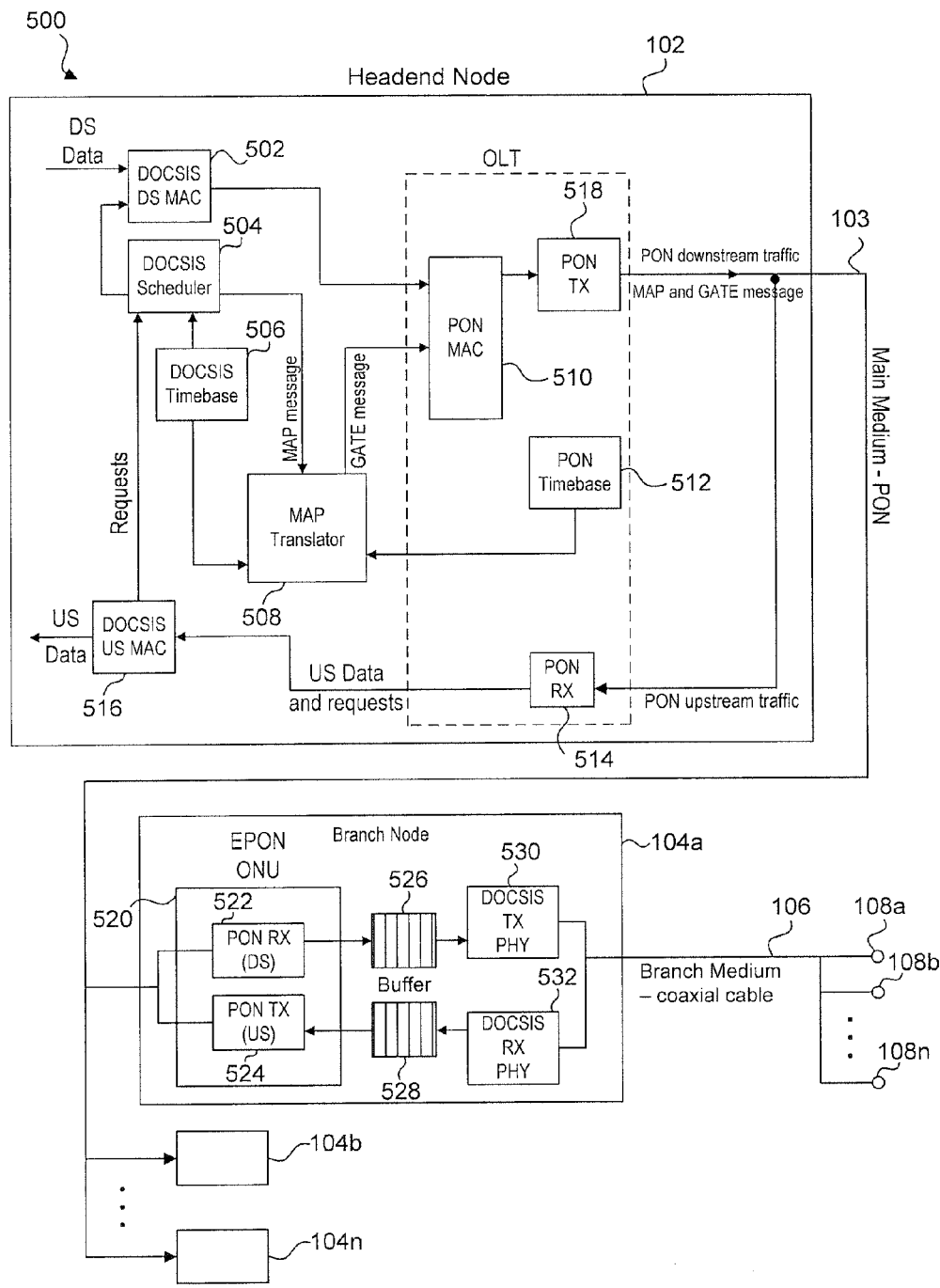
FIG. 5 illustrates an example two-tier network with minimal buffering and scheduling delays.

FIG. 5 illustrates an example network 500 that minimizes buffering and scheduling delays. In network 500, main medium 103 is a PON and branch medium 106 is a coaxial cable network. In the present example, headend node 102 includes a DOCSIS downstream Media Access Control (DS MAC) 502, a DOCSIS scheduler 504, a PON MAC 510, a DOCSIS timebase 506, a MAP translator 508, a PON timebase 512, a PON transmission Physical Layer (PHY TX) 518, a PON receive Physical Layer (PHY RX) 514 and a DOCSIS upstream MAC (DOCSUS US MAC) 516. Each branch node 104 includes an EPON ONU 520, a DOCSIS transmit PHY (DOCSIS TX PHY) 530 and a DOCSIS receive PHY (DOCSIS RX PHY) 532. EPON ONU 520 includes a PON receive PHY (PON RX) 522 coupled to a buffer 526 which is coupled to DOCSIS TX PHY 530. DOCSIS RX PHY 532 is coupled to buffer 528 which is coupled to Passive Optical Network transmit PHY (PON TX) 524. PON TX 518 and PON RX 514 form the interface between headend node 102 and main medium 103, which is PON in this example. PON TX 524 and PON RX 522 provide the interface between branch node 104 and main medium 103. DOCSIS TX PHY 530 and DOCSIS RX PHY 532 provide the interface between branch node 104 and branch media 106 which is coaxial cable in this example.

In network 500, for upstream communications, a bandwidth request transmitted by an end station 108, which may be a cable modem, is received by DOCSIS RX PHY 532. The request is buffered in buffer 528 and transmitted by PON TX 524 to headend 102. The request is received by PON RX 514 and forwarded to DOCSIS upstream MAC 516, which in turn forwards the request to DOCSIS scheduler 504. In response to receiving the request, DOCSIS scheduler 504 generates a MAP message that allocates bandwidth to the end station 108 that requested the bandwidth based on QoS parameters associated with a flow corresponding to the request, a service level agreement associated with the flow and/or with the end station 108 that generated the request, and possibly other considerations. The MAP message also assigns a first instance in time to the end station 108. The first instance in time is a time at which the end station 108 can begin to transmit data based on timing information from DOCSIS timebase 506. The MAP message generated by DOCSIS scheduler 504 is sent to MAP translator 508 and to the DOCSIS DS MAC 502 for transmission back to the end station 108.

The MAP translator 508, based on the MAP message generated by DOCSIS scheduler 504, approximately determines a second instance in time at which data from end station 108 would arrive at branch node 104, assuming that end station 108 transmits data at the first instance in time allocated in the MAP message. The MAP message must not contain any contention regions, since contention is not supported by EPON. MAP translator 508 may store information such as processing speed of branch nodes 104 and transmission speeds of branch media 106 that allows it to approximately determine the second instance in time at which data would arrive at a branch node 104. MAP translator, based on PON timing information, received from PON timebase 512, generates a GATE message that allows branch node 104 to transmit the data received from end station 108 beginning at approximately the second instance in time to headend node 102. The second instance in time may accommodate for timing and processing delays by both an end station 108 and a branch node 104. Thus, the first instance in time is a time at which the end station 108 can transmit data to branch node 104 and the second instance in time is a time substantially equal to, or shortly after, a time at which the branch node 104 receives the data from the end station 108 and is ready to transmit the received data to headend node 102.

The MAP translator 508 is cognizant of PHY parameters in use on both main medium 104 and branch media 106 so that it can ensure the size of the GATE allocation is sufficient to carry the amount of data that will be transmitted by an end station 108 during the MAP allocation. The MAP translator 508 must also be cognizant of the timebase of both the DOCSIS and EPON systems, as well as the expected delays through the branch node 104 from the time a burst is transmitted by an end station 108 until the time it has been processed by the branch node 104 and is ready to be transmitted to headend node 102. This is necessary to ensure that the GATE message contains the correct start time. To minimize the delay, the GATE should begin as soon as possible after data is ready, but it must not start before data is ready or the transmit opportunity will be missed and another opportunity will have to be provided at a later time, increasing delay even further.

The MAP message generated by DOCSIS scheduler 504 is sent to DOCSIS DS MAC 502, which transmits the MAP via PON MAC 510 and PON TX 518 to branch node 104. The MAP message is received by PON RX 522 in branch node 104a, buffered in buffer 526 and forwarded to a destination end station 108 via DOCSIS TX PHY 530. The GATE message generated by MAP translator 508 is transmitted via PON MAC 510 and PON PHY 518 to branch node 104a. The GATE message is not forwarded by branch node 104a to an end station 108. The GATE message indicates the second instance in time and the duration of time available for branch node 104a to transmit data received from an end station 108 to headend node 102.

In the absence of MAP translator 508, upon receiving data from an end station 108, the branch node 104 would have to first buffer the data in buffer 528 followed by requesting headend node 102 to schedule a time at which the branch node 104 can transmit the received data to headend node 102. The branch node 104 would then have to wait until it received a GATE message from headend node 102 allocating bandwidth for transmission of received data to headend node 102. Thus, by scheduling transmission times upfront for both an end station 108 and a branch node 104, MAP translator 508 approximately aligns a time at which data is received by a branch node 104 from an end station 108 with a time at which data is transmitted by the branch node 104 to headend node 102 so as to minimize scheduling and buffering delays. Buffering may still occur at a branch node 104 but it will be for a minimal duration of time since the upstream scheduling has been done "up front" by the MAP translator 508. The present example is characterized by the lack of a PON scheduler since the DOCSIS scheduler in conjunction with the MAP translator performs scheduling for both tiers in network 500. This allows headend node 102 to pre-allocate the requested bandwidth to transmit data received from an end station 108 and it also aligns the time at which branch node 108 sends the data so that there is little buffering or scheduling delay involved.

In an example, an end station 108 transmits a DOCSIS request for bandwidth to a corresponding branch node 104. Branch node 104 may have a pre-authorized grant from headend node 102 to transmit the DOCSIS request for bandwidth to headend node 102.

DOCSIS scheduler 504 issues a grant in a MAP message, which is sent to branch node 104 and then to end station 108. MAP translator 508 generates a GATE message based on the MAP message such that a time at which data from end station 108 arrives at branch node 104 is aligned with an instance in time at which branch node 104 can transmit the received data to headend node 102. The GATE message is transmitted to the branch node 108.

The end station 108 transmits data at an instance in time indicated by the MAP message. Branch node 104 receives the data and transmits it to headend node 102 with minimal delay based on an instance in time indicated by the GATE message.

In the downstream direction, headend node 102 receives packets from a backend network, such as the Internet (not shown) and performs DOCSIS classification to determine the destination end station 108 and a corresponding service flow (for DOCSIS QoS purposes) to be used. The DOCSIS scheduler 504 determines the order of transmission of packets in the downstream direction and the total amount of data that can be transmitted to an end station 108 without exceeding the capacity of the coaxial portion (branch media 106) of the downstream, which may have less capacity than the PON (main medium 104). The DOCSIS scheduler 504 delivers packets to PON MAC 510 via DOCSIS DS MAC 502 in the desired order and at an appropriate rate. In the present example, downstream classification and QoS functions of EPON MAC 510 are bypassed so that received packets are transmitted in an order chosen by DOCSIS scheduler 504.

In summary, the embodiment in FIG. 5 offers a way for a service provider to centralize scheduling functions in headend node 102 while retaining functions of the DOCSIS protocol end-to-end such as QoS and service level agreements for each end station 108 while incorporating the EPON protocol over the optical portion of network 500. Allocations made by the DOCSIS scheduler 504 are translated into corresponding allocations for EPON and transmitted to the EPON branch nodes 104 in the appropriate format. Essentially, the EPON network is "slaved" to the DOCSIS scheduler 506. In particular, in the upstream direction, allocations scheduled for individual end stations 108 by the DOCSIS scheduler 504 in the headend node 102 are translated into EPON allocations to the appropriate branch node 104 at the appropriate time. Transmissions from end stations 108 over the coaxial cable received by the branch node 104, then experience minimal buffering delay, since their arrival is immediately followed by the start of an allocated timeslot on the PON for continued transmission of the data by the branch node 104 to headend node 102.

Figure 6:
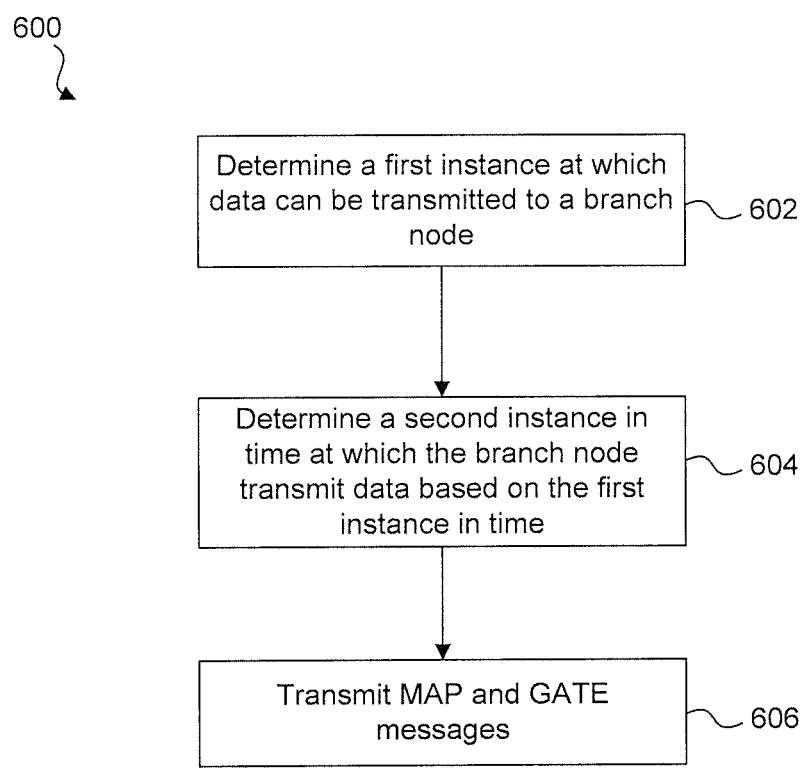
FIG. 6 illustrates an example flowchart illustrating steps performed by a headend node for scheduling in a two-tier network.

FIG. 6 illustrates an example flowchart 600 illustrating steps performed by a headend node for scheduling in a two-tier network. Flowchart 600 will be described with continued reference to the example operating environment depicted in FIG. 5. However, the flowchart is not limited to that embodiment. Note that some steps shown in flowchart 600 do not necessarily have to occur in the order shown.

In step 602, a first instance in time at which an end station can transmit data to a branch node is determined. For example, DOCSIS scheduler 504 determines a first instance in time at which an end station 108 can transmit data to a branch node 104. DOCSIS scheduler 504 generates a MAP message that allocates the first instance in time to the end station 108.

In step 604, a second instance in time at which the branch node can transmit data received in step 602 to the headend node is determined. In an embodiment, the second instance in time is approximately equal to a time at which data arrives from the end station 108, allowing for any receive processing time needed by branch node 104. For example, MAP translator 508 based on the first instance in time in the MAP message and based on data from PON timebase 512 determines the second instance in time. MAP translator 508 generates a GATE message that allocates the second instance in time to the branch node 104.

In step 606, the MAP message and GATE message are transmitted. For example, headend node 102 transmits both the MAP and GATE messages. The branch node 104 stores and processes the GATE message and forwards the MAP message to the end station 108.

Figure 7:
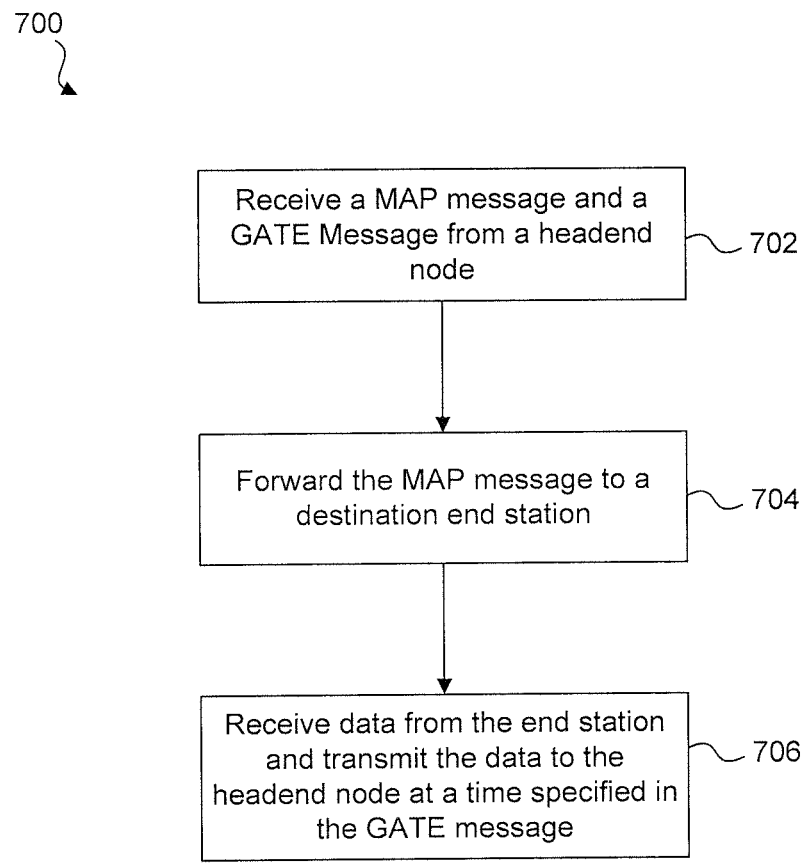
FIG. 7 illustrates an example flowchart illustrating steps performed by a branch node in a two-tier network.

FIG. 7 illustrates an example flowchart 700 illustrating steps performed by a branch node in a two-tier network. Flowchart 700 will be described with continued reference to the example operating environment depicted in FIG. 5. However, the flowchart is not limited to that embodiment. Note that some steps shown in flowchart 700 do not necessarily have to occur in the order shown.

In step 702, a MAP message and a GATE message are received. For example, a MAP message that allocates a first instance in time to an end station 108 to transmit data is received along with a GATE message. The GATE message allocates a second instance in time to a branch node 104 to transmit data received from the end station 108.

In step 704, the MAP message is transmitted to an end station and the GATE message is stored and processed. For example, a branch node 104 stores and processes the GATE message and forwards the MAP message to its corresponding destination end station 108. The branch node 104 prepares to transmit data received from the end station 108 at approximately the second instance in time indicated in the GATE message.

In step 706, data is received from the end station at approximately the second instance in time and is transmitted upstream to a headend node at approximately the second instance in time allocated in the GATE message.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 8:
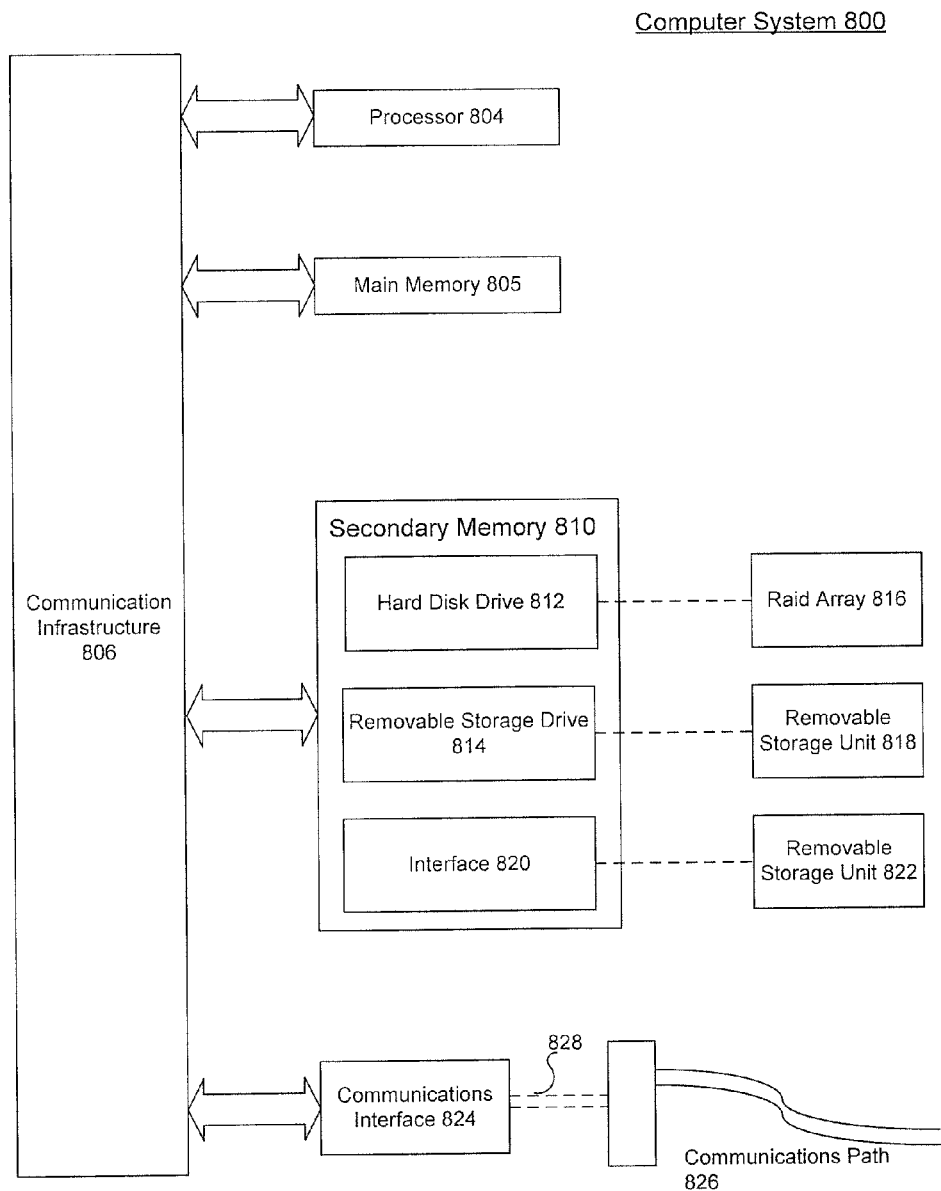
FIG. 8 illustrates is a block diagram of an exemplary computer system on which the embodiments can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 800 is shown in FIG. 8. The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the disclosure using other computer systems and/or computer architectures.

Computer system 800 also includes a main memory 805, preferably random access memory (RAM), and may also include a secondary memory 810. The secondary memory 810 may include, for example, a hard disk drive 812, and/or a RAID array 816, and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCM-CIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

The terms "computer program medium" and "computer usable medium" are used herein to generally refer to media such as removable storage drive 814, a hard disk installed in hard disk drive 812, and signals 828. These computer program products are means for providing software to computer system 800.

Computer programs (also called computer control logic) are stored in main memory 805 and/or secondary memory 810. Computer programs may also be received via communications interface 824. Such computer programs, when executed, enable the computer system 800 to implement the present disclosure as discussed herein. In particular, the computer programs, when executed, enable the processor 804 to implement the processes of the present disclosure. For example, when executed, the computer programs enable processor 804 to implement part of or all of the steps described above with reference to the flowcharts herein. Where the disclosure is implemented using software, the software may be stored in a computer program product and loaded into computer system 800 using raid array 816, removable storage drive 814, hard drive 812 or communications interface 824.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A first node for scheduling upstream transmission times in a two-tier network, the first node comprising:
   a scheduler configured to generate a first message to allocate bandwidth and a first instance in time at which an end station is to transmit data to a second node over a first medium of the two-tier network; and
   a message translator, coupled to the scheduler, configured to determine a second instance in time at which the data from the end station is to arrive at the second node and to generate a second message to allocate bandwidth to the second node to transmit the data received from the end station at the second instance in time to the first node over a second medium of the two-tier network.

2. The first node of claim 1, wherein the scheduler comprises:
a Data Over Cable Service Interface (DOCSIS) scheduler, wherein the end station comprises:
a cable modem,
wherein the first message comprises:
a MAP message,
wherein the second message comprises:
a GATE message,
wherein the first medium of the two-tier network comprises:
a coaxial cable medium, and
wherein the second medium of the two-tier network comprises:
an optical medium.

3. The first node of claim 1, wherein the scheduler is further configured to receive a request for the bandwidth from the second node, and
wherein the request originates from the end station coupled to the second node over the first medium.

4. The first node of claim 1, wherein the scheduler is further configured to determine the first instance in time and the bandwidth to be allocated based on a Quality of Service (QoS) and a service level agreement.

5. The first node of claim 1, further comprising:
a timebase coupled to the scheduler, the scheduler being configured to determine the first instance in time based on data received from the timebase.

6. The first node of claim 1, further comprising:
a timebase coupled to a MAP translator, the MAP translator being configured to determine the second instance in time based on data received from the timebase.

7. The first node of claim 2, further comprising:
a Passive Optical Network (PON) physical (PHY) layer configured to transmit the MAP message and the GATE message,
wherein the second node is configured to store and to process the GATE message and to forward the MAP message to the cable modem.

8. A first node, comprising:
a first downstream Physical Layer (PHY) configured to:
receive a first message from a second node, the first message being configured to assign a first instance in time at which an end station is to transmit data to the first node , and
receive a second message from the second node, the second message being configured to assign a second instance in time at which the first node is to transmit the data received from the end station to the second node, wherein the second instance in time is approximately equal to a time at which the data is received by the first node from the end station; and
a second downstream PHY, coupled to the first downstream PHY, configured to transmit the first message to the end station.

9. The first node of claim 8, wherein the first downstream PHY comprises:
a Passive Optical Network (PON) downstream PHY, wherein the second downstream PHY comprises:
a Data Over Cable Service Interface Specification (DOC SIS) PHY,
wherein the first message comprises:
a MAP message,
wherein the second message comprises:
a GATE message,
wherein the end station comprises:
a cable modem, and
wherein the second node comprises:
a Cable Modem Termination System (CMTS).

10. The first node of claim 9, wherein the first node is coupled to the second node over a PON and to the cable modem over a coaxial network.

11. The first node of claim 8, further comprising:
a buffer configured to store the data received from the end station prior to transmitting the data to the second node.

12. A method for scheduling upstream transmission times in a two-tier network, the method comprising:
generating a first message that allocates bandwidth and a first instance in time to a first device for transmitting data to a first node;
determining a second instance in time at which the data from the first device is to arrive at the first node; and
generating a second message to allocate bandwidth to the first node to transmit the data received from the first device, at the second instance in time, to a second node.

13. The method of claim 12, further comprising:
receiving a request for the bandwidth from the first node, wherein the request originates from the first device.

14. The method of claim 12, further comprising:
determining the first instance in time and the bandwidth based on a Quality of Service (QoS) and a service level agreement associated with the first device.

15. The method of claim 12, wherein the first device comprises:
a cable modem, and
wherein the second node comprises:
a Cable Modem Termination System (CMTS).

16. The method of claim 15, further comprising:
determining the first instance in time based on data received from a Data Over Cable Service Interface Specification (DOCSIS) timebase.

17. The method of claim 15, wherein the determining comprises:
determining the second instance in time based on data from a Passive Optical Network (PON) timebase.

18. The method of claim 15, wherein the first message comprises:
a MAP message, and
wherein the second message comprises:
a GATE message.

19. The method of claim 18, further comprising:
transmitting the MAP message and the GATE message;
storing and processing, by the first node, the GATE message to determine the second instance in time; and
forwarding, by the first node, the MAP message to the cable modem; and
storing and processing, by the cable modem, the MAP message to determine the first instance in time.

20. The method of claim 12, wherein the first node comprises:
a branch node.

* * * * *

UNITED STATES PATENT AND TRADEMARK OFFICE
CERTIFICATE OF CORRECTION

PATENT NO. : 9,450,692 B2
APPLICATION NO. : 14/724235
DATED : September 20, 2016
INVENTOR(S) : Niki Pantelias Page 1 of 1

It is certified that error appears in the above-identified patent and that said Letters Patent is hereby corrected as shown below:

In the Claims

Claim 9, Column 14, Line 2, replace "(DOC SIS) PHY", with -- (DOCSIS) PHY, --.

Signed and Sealed this
Twentieth Day of March, 2018

Andrei Iancu
*Director of the United States Patent and Trademark Office*